(12) United States Patent
Horii et al.

(10) Patent No.: US 7,373,305 B2
(45) Date of Patent: *May 13, 2008

(54) ACCOUNTING APPARATUS, ACCOUNTING METHOD, AND COMPUTER-READABLE PROGRAM STORAGE MEDIUM FOR STORING PROGRAM HAVING ACCOUNTING FUNCTION

(75) Inventors: Shinichi Horii, Kanagawa (JP); Shigeyoshi Hirashima, Kanagawa (JP); Hiroshi Tokunaga, Tokyo (JP); Masato Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/489,997

(22) Filed: Jul. 20, 2006

(65) Prior Publication Data

US 2006/0253404 A1    Nov. 9, 2006

Related U.S. Application Data

(63) Continuation of application No. 09/908,018, filed on Jul. 18, 2001.

(30) Foreign Application Priority Data

Jul. 19, 2000    (JP)    ............... 2000-223878

(51) Int. Cl.
*G06Q 99/00*    (2006.01)

(52) U.S. Cl. .................. 705/1; 705/29; 705/34; 705/40; 705/400; 347/7

(58) Field of Classification Search ............... 705/34, 705/400, 1; 358/1.1, 8
See application file for complete search history.

(56) References Cited

U.S. PATENT DOCUMENTS

| | | | | | |
|---|---|---|---|---|---|
| 3,974,363 | A | * | 8/1976 | Malinich | 377/8 |
| 4,831,555 | A | * | 5/1989 | Sansone et al. | 358/1.14 |
| 5,146,344 | A | * | 9/1992 | Bennett et al. | 358/296 |
| 5,383,129 | A | * | 1/1995 | Farrell | 705/400 |
| 5,659,845 | A | * | 8/1997 | Krist et al. | 399/79 |

(Continued)

FOREIGN PATENT DOCUMENTS

JP    11314375 A    * 11/1999

(Continued)

OTHER PUBLICATIONS

"Ink is Under Control", Jul. 13, 1998, Printing News, v141, n2, p. 16.*

(Continued)

*Primary Examiner*—John W. Hayes
*Assistant Examiner*—Freda A. Nelson
(74) *Attorney, Agent, or Firm*—Frommer Lawrence & Haug LLP; William S. Frommer; Paul A. Levy

(57) ABSTRACT

A printer performs a printing operation by driving a cartridge to discharge ink. The ink in the printer is billed according to the amount of actual use of ink. In a service center, the head ID is first input. Then, the head ID is verified against the user ID. The amount of the use of ink is checked. Then, the billing amount for the actual use of ink is determined. The user is requested to pay for the cost.

6 Claims, 19 Drawing Sheets

U.S. PATENT DOCUMENTS

| | | | |
|---|---|---|---|
| 5,745,883 A * | 4/1998 | Krist et al. | 705/34 |
| 5,802,420 A | 9/1998 | Garr et al. | |
| 5,956,698 A * | 9/1999 | Lacheze et al. | 705/34 |
| 6,052,547 A | 4/2000 | Cuzzo et al. | 399/79 |
| 6,216,113 B1 * | 4/2001 | Aikens et al. | 705/34 |
| 6,229,622 B1 * | 5/2001 | Takeda | 358/1.16 |
| 6,266,493 B1 * | 7/2001 | Farrell et al. | 399/24 |
| 6,360,174 B1 * | 3/2002 | Shoki | 702/55 |
| 6,477,443 B2 * | 11/2002 | Salgado et al. | 700/220 |
| 7,068,382 B1 * | 6/2006 | Silverbrook et al. | 358/1.15 |
| 2002/0077979 A1 * | 6/2002 | Nagata | 705/40 |
| 2002/0135624 A1 * | 9/2002 | Naka et al. | 347/7 |

FOREIGN PATENT DOCUMENTS

| | | |
|---|---|---|
| WO | WO 99 36835 | 7/1999 |
| WO | WO 00 26034 | 5/2000 |

OTHER PUBLICATIONS

"Ink is Under Control", Jul. 13, 1998, Printing News, vol. 141, No. 2, p. 16.

* cited by examiner

FIG. 12

THE AMOUNT OF INK USED UNTIL THE DATE INDICATED BELOW AND THE BILL ARE AS FOLLOWS

| DATE | | 2000/03/22 15:00 | BILLING AMOUNT |
|---|---|---|---|
| AMOUNT OF USED INK [cc] | Yellow | 5 | ¥ 3,400 |
| | Magenta | 6 | |
| | Cyan | 11 | |
| | Black | 12 | |

THE FOLLOWING AMOUNT IS BILLED

BILLING AMOUNT    ¥ 3,400

WILL YOU TRANSFER MONEY FROM REGISTERED BANK ACCOUNT?

Yes    No

THE AMOUNT OF UNUSED INK ON THE DATE INDICATED BELOW AND THE REFUND ARE AS FOLLOWS

| DATE | | 2000/03/22 15:00 | REFUND |
|---|---|---|---|
| AMOUNT OF USED INK [cc] | Yellow | 10 | ¥ 4,100 |
| | Magenta | 9 | |
| | Cyan | 4 | |
| | Black | 18 | |

THE FOLLOWING AMOUNT IS REFUNDED

REFUND AMOUNT    ¥ 4,100

WOULD YOU LIKE US TO TRANSFER MONEY INTO REGISTERED BANK ACCOUNT?

[ Yes ]    [ No ]

```
THE FOLLOWING AMOUNT IS REFUNDED

REFUND AMOUNT    ¥ 4,100

PLEASE SPECIFY THE BANK ACCOUNT

BANK NAME :    [        ]
BRANCH NAME :  [        ]
ACCOUNT NO :   [        ]
```
~76,76a

FIG. 20

LIST OF INK ACCOUNTING METHODS

DESCRIPTION

IN METHOD A, ACCOUNTING IS DETERMINED BY......
IN METHOD B, ACCOUNTING IS DETERMINED BY......
IN METHOD C, ACCOUNTING IS DETERMINED BY......

PLEASE CHECK AND SELECT ACCOUNTING METHOD

SELECT METHOD A    1
SELECT METHOD B    2
SELECT METHOD C    3

[1] [2] [3]   [SET]

| DESCRIPTION OF MAINTENANCE AND BILLING SYSTEM |
|---|
| TYPES OF MAINTENANCE AND BILLING SYSTEM<br><br>FOLLOWING ITEMS CAN BE SELECTED<br>• FLAT RATE FOR EVERY HEAD REPLACEMENT<br>• FLAT RATE UP TO THE USE OF CERTAIN AMOUNT OF INK<br>• RANK RATE ACCORDING TO THE USE OF INK<br>• BASIC FEE PLUS VARIABLE RATE ACCORDING TO THE USE OF INK<br>• VARIABLE RATE ACCORDING TO THE USE OF INK<br>• FLAT RATE PLUS REFUND FOR THE UNUSED INK<br>• BASIC FEE PLUS (FLAT RATE PLUS REFUND) |

76, 76a

ACCOUNTING APPARATUS, ACCOUNTING METHOD, AND COMPUTER-READABLE PROGRAM STORAGE MEDIUM FOR STORING PROGRAM HAVING ACCOUNTING FUNCTION

This is a continuation of application Ser. No. 09/908,018, filed Jul. 18, 2001, which claims priority to Japanese Patent application number 2000-223878, filed Jul. 19, 2000, the entirety of which is incorporated herein by reference.

BACKGROUND OF THE INVENTION

1. Field of the Invention

The present invention relates to an accounting apparatus and an accounting method for billing for the use of ink in a printer. The invention also relates to a computer-readable program storage medium for storing a program having an accounting function.

2. Description of the Related Art

Hitherto, typical methods for printing out hard copies include an electrophotographic printing method, an ink-jet printing method, a wire-dot printing method, a thermal recording method, and a thermal transfer recording method. Among these methods, the ink-jet printing method is coming into wide use because of the quality of printed characters and photographs, compatibility with various devices, such as computers and digital cameras, printing speed, and quiet operation. In the ink-jet printing method, ink is discharged from fine holes in an ink-discharge head to a recording medium. Printers using this method are less noisy and comparatively small, and thus, their market share is increasing.

Printers using the ink-jet printing method are often used in homes and offices because of their ease of use and general versatility. The amount of ink spent in these environments is smaller than that used for industrial purposes, and thus, the ink is often stored in a small-capacity ink tank installed in the printer.

Basically, there are two types of structures for the ink tank and the discharge head in the printer. In the first type of structure, the ink tank and the discharge head are separately disposed from each other, and a flexible tube is disposed in an ink passage to connect the ink tank and the discharge head. In the second type of structure, the ink tank and the discharge head are integrated into each other, and the ink is directly filled in the discharge head (ink cartridge). In both types of structures, when the ink runs out, printing can no longer be performed. It is thus necessary to refill the ink or to replace the ink cartridge.

In the second type of structure, when one color of ink runs out in an ink cartridge containing a plurality of colors of ink, the whole cartridge must be replaced. Accordingly, the user has to discard the other colors of ink which can still be used, thereby hampering the effective use of the ink.

One measure to solve this problem is to form an ink tank cartridge containing only one color of ink. With this arrangement, however, the user has to prepare a plurality of ink cartridges for the individual colors of ink as a stock.

Additionally, in the ink cartridge integrating the ink tank and the discharge head therein, if the discharge head does not properly function, the whole cartridge must be replaced even though the ink does not run out. In this case, the user has to discard the whole ink cartridge regardless of whether the ink cartridge is still full of one color of ink or a plurality of colors of ink. This also prevents the effective use of the ink.

SUMMARY OF THE INVENTION

Accordingly, in order to solve the above-described problems, it is an object of the present invention to provide an accounting apparatus and an accounting method for billing a user for the actual use of ink in a cartridge installed in a printer, and also to provide a computer-readable program storage medium for storing a program having an accounting function.

In order to achieve the above object, according to one aspect of the present invention, there is provided an accounting apparatus including a printer for performing a printing operation by driving a cartridge to discharge ink. The ink stored in the printer is billed according to an amount of ink used for performing the printing operation.

With this arrangement, the user is billed according to the actual use of ink even if a cartridge storing unused ink is replaced because of a malfunction of the cartridge, thereby avoiding the waste of unused ink.

In the aforementioned accounting apparatus, the ink may be billed after the amount of ink used for performing the printing operation is detected. With this arrangement, the user is billed for the actual use of ink according to a post-payment method even if a head for discharging ink in an ink cartridge which still stores unused ink is replaced.

The billing amount for the ink used for performing the printing operation may be indicated. This enables the user to visually check the billing amount.

In the above-described accounting apparatus, the ink may be prebilled according to a largest possible amount of ink filled in the cartridge, and a refund may be given according to a remaining amount of ink detected in the cartridge.

With this arrangement, by using the ink for the printing operation, the remaining amount of ink is detected in the printer. Then, money is refunded to the user of the printer according to the remaining amount of ink.

The amount of refund according to the remaining amount of ink may be indicated. This enables the user to visually check the amount of refund.

The above-described cartridge includes at least a storage unit for storing the ink, and a discharge head for discharging the ink.

With this arrangement, even if the discharge head does not function properly in the printer which still stores unused ink, the user is not billed for the unused ink, thereby promoting the effective use of ink.

The above-described cartridge may include at least a plurality of integrated storage units, each storage unit storing one type of ink. With this arrangement, the user is billed for the actual use of ink even if one of the storage units is replaced due to the shortage of ink.

According to another aspect of the present invention, there is provided an accounting method including the step of billing for ink stored in a printer for performing a printing operation by discharging the ink according to an amount of the ink used for performing the printing operation.

According to still another aspect of the present invention, there is provided a computer-readable program storage medium for storing a program having an accounting function for billing for ink stored in a printer for performing a printing operation by discharging the ink according to an amount of the ink used for performing the printing operation.

According to the accounting method and the computer-readable program storage means, operations and advantages similar to those exhibited by the above-described accounting apparatus can be offered.

BRIEF DESCRIPTION OF THE DRAWINGS

FIGS. 12, 13, and 14 illustrate examples of the screens shown on a display unit;

FIGS. 17, 18, and 19 illustrate examples of the screens shown on a display unit;

FIG. 20 illustrates an example of a list of accounting methods for the use of ink; and FIG. 21 illustrates an example of a screen on which a description of the types of maintenance and the billing systems is indicated.

DESCRIPTION OF THE PREFERRED EMBODIMENTS

The present invention is described in detail below with reference to the accompanying drawings through illustration of preferred embodiments.

Various technical restrictions are imposed on the following preferred embodiments of the present invention. In the following description, however, the scope of the present invention is not limited to the disclosed embodiments unless otherwise stated.

First Embodiment

Figure 1:
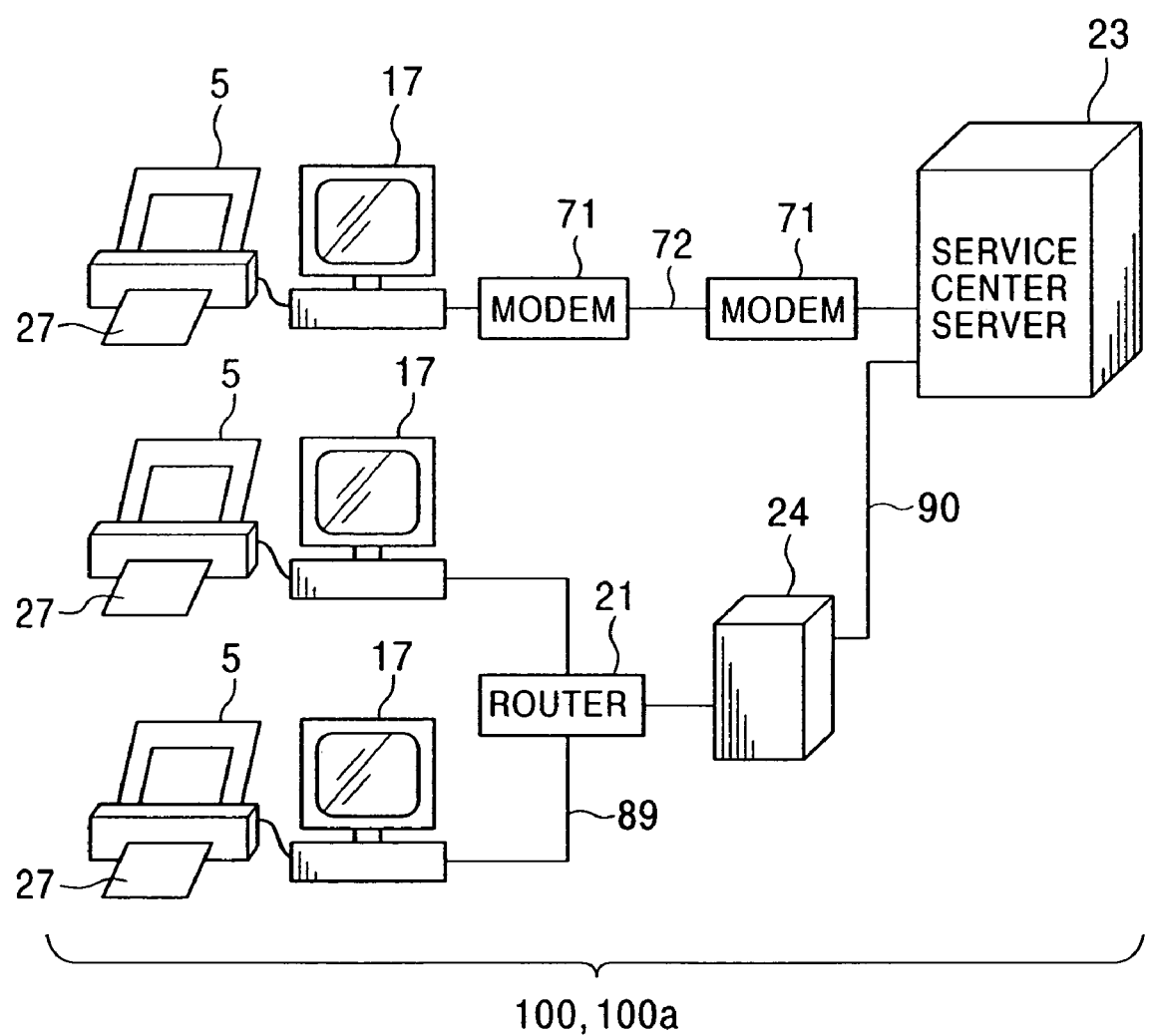
FIG. 1 is a block diagram illustrating the configuration of an accounting system according to a first embodiment of the present invention.

FIG. 1 is a block diagram illustrating the configuration of an accounting system (apparatus) 100 according to a first embodiment of the present invention. Since the accounting system 100 is only schematically shown in FIG. 1, the external view of the printers 5 is also an example only.

The accounting system 100 includes communication media for performing data communication among a service center server 23, computers 17, and the printers 5, and also between the service center server 23 and the computers 17. The communication media for performing data communication between the service center server 23 and the computers 17 may be two modems 71 and a telephone line 72, or may be a network 89, a router 21, and a network 90. The network 90 may be the Internet. In the second case, the communication media may also include a server 24. In the following description, it is assumed that the communication media is implemented by the second type of media.

If the network 90 is the Internet, the server 24 is a server computer of an Internet provider. Accordingly, the accounting system 100 can perform data communication between the service center server 23 and the computers 17.

The service center server 23 is a server computer installed in a service center which obtains and examines the statuses of the printers 5 connected to the corresponding computers 17 via a printer cable or a network. The computers 17 are one type of electronic device which provides printing instructions to the corresponding printers 5 to print out characters or images. The printers 5 then print out the characters or images on recording sheets 27 according to the instructions of the corresponding computers 17. The router 21 and the network 89 form a local area network (LAN) for connecting the plurality of computers 17.

The printers 5 may be connected to the service center server 23 by using the computers 17 via the network 90. Alternatively, the printers 5 may be connected to the service center server 23 without the computers 17.

Figure 2:
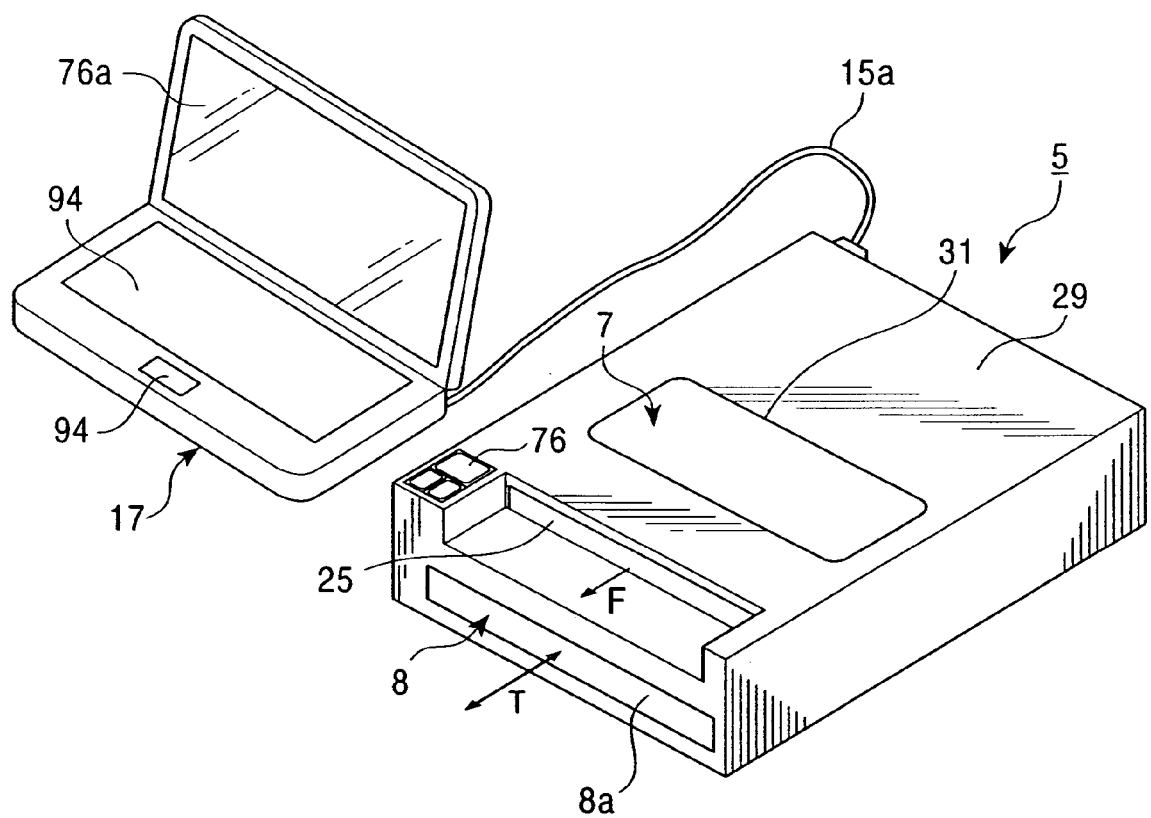
FIG. 2 is a perspective view illustrating an example of an external view of a printer and a computer shown in FIG. 1.

FIG. 2 is a perspective view illustrating the external view of the printer 5 and the computer 17 shown in FIG. 1.

The computer 17 is, for example, a notebook-type personal computer, and is connected to the printer 5 via a printer cable 15a. The computer 17 may be a desk-top personal computer. The computer 17 includes at least a display unit 76a and an operation unit 94. The display unit 76a is, for example, a liquid crystal display unit, for displaying characters, images, and so on. Alternatively, a display unit 76 of the printer 5 may be used for displaying characters, images, and so on. The operation unit 94 may be a touch panel, a mouse, or a keyboard, through which a user is able to perform an operation on the computer 17.

Figure 3:
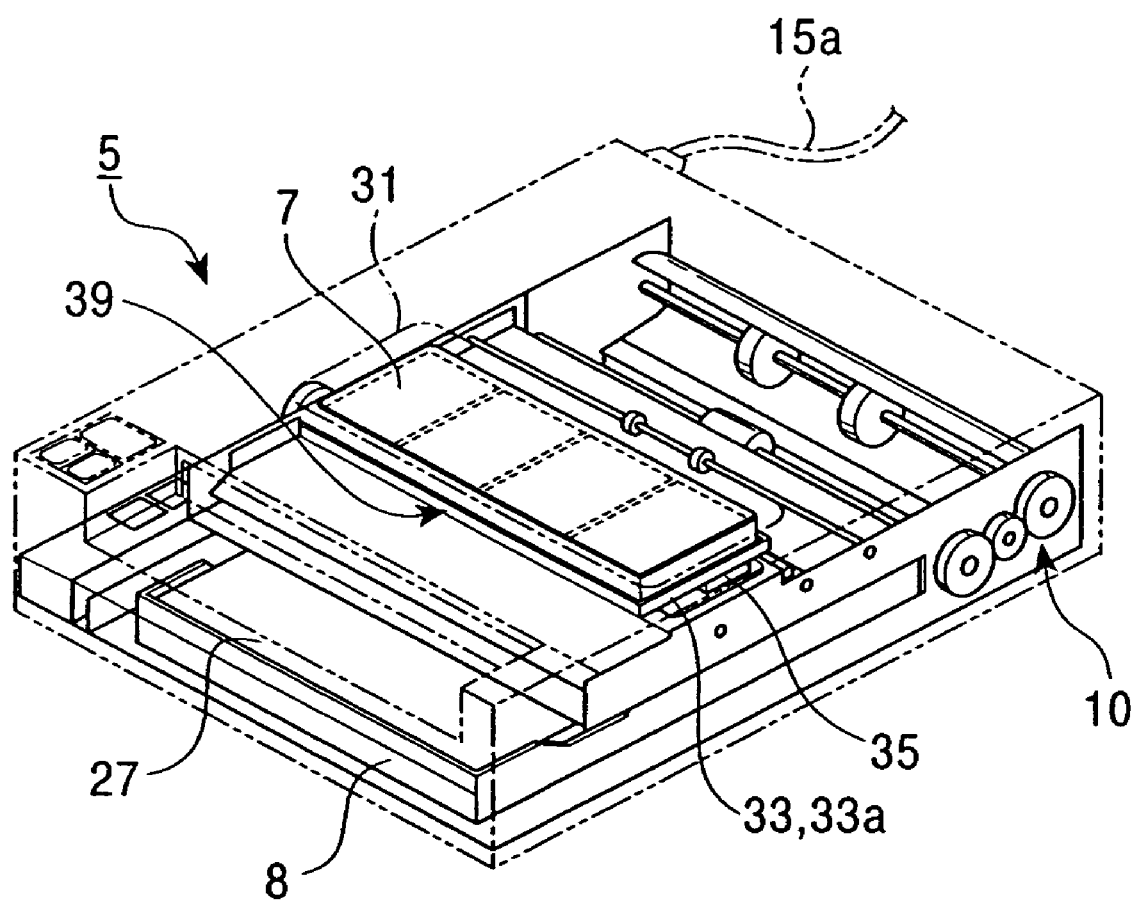
FIG. 3 is a transparent perspective view illustrating the configuration of the printer shown in FIG. 2.
Figure 4:
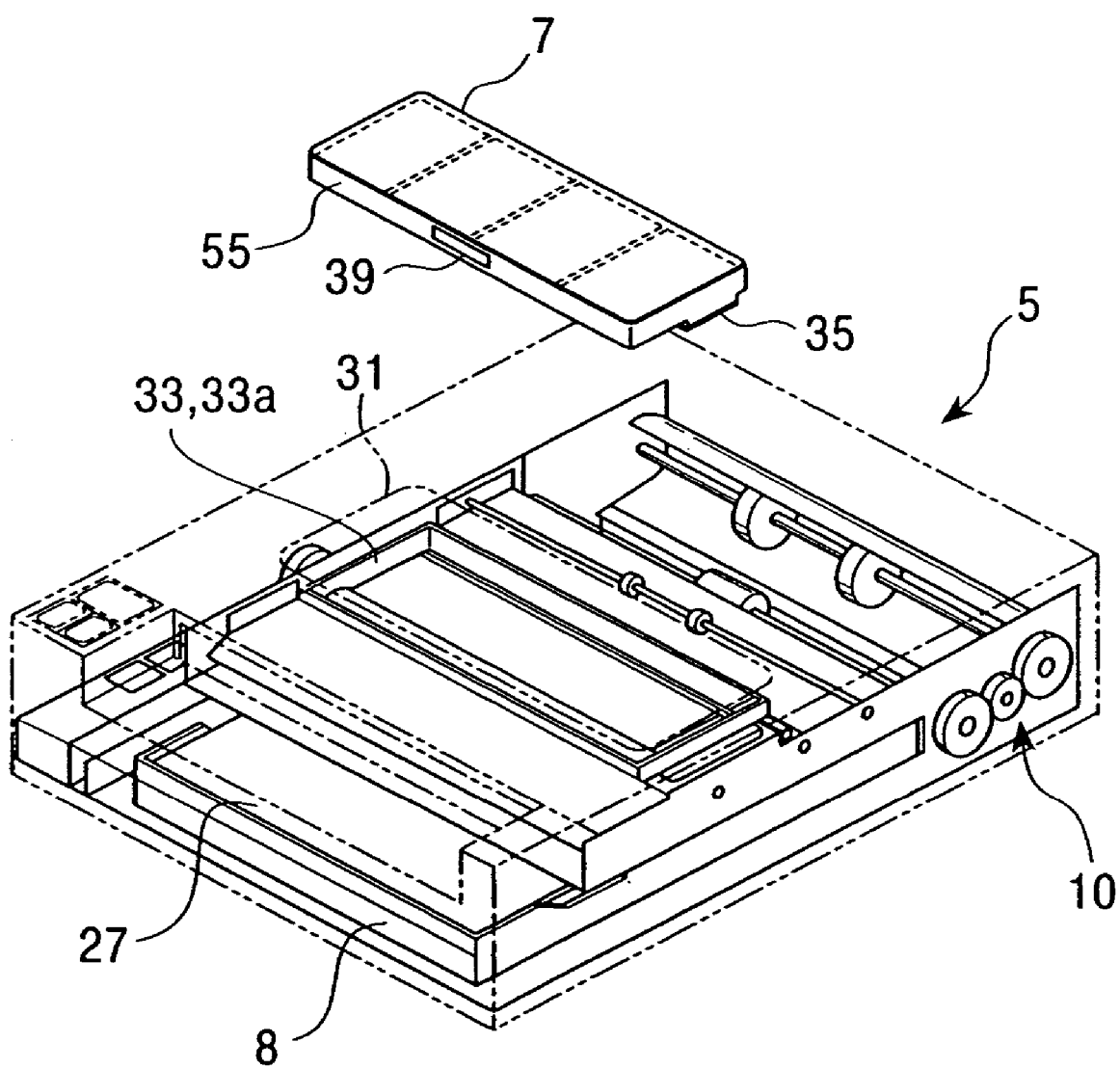
FIG. 4 is a transparent perspective view illustrating the printer shown in FIG. 3 from which a head assembly is removed.

FIG. 3 is a transparent perspective view illustrating the configuration of the printer 5 shown in FIG. 2. FIG. 4 is a transparent perspective view illustrating the printer 5 shown in FIG. 3 from which a head assembly (cartridge) 7 is removed.

A holder 33 for detachably holding the head assembly 7 is provided for the printer 5. When the head assembly 7 is fixed on the printer 5, the holder 33 holds the head assembly 7 so that a discharge head 35 for discharging ink therefrom faces down. Then, the discharge head 35 faces a recording sheet 27 supplied from a tray 8 by a printer mechanism 10 with a small space between the discharge head 35 and the recording sheet 27. The discharge head 35 then discharges ink onto the recording sheet 27 under the control of a predetermined printer controller so as to print predetermined characters and images. The printer mechanism 10 provides mechanical functions in the printer 5, and is used for the operations performed by the printer 5. For example, a feeder feeds the recording sheets 27 from the tray 8, a sheet feeder including rollers feeds the recording sheets 27, and a discharge unit discharges the printed recording sheets 27 by using the mechanical functions of the printer mechanism 10.

Figure 5:
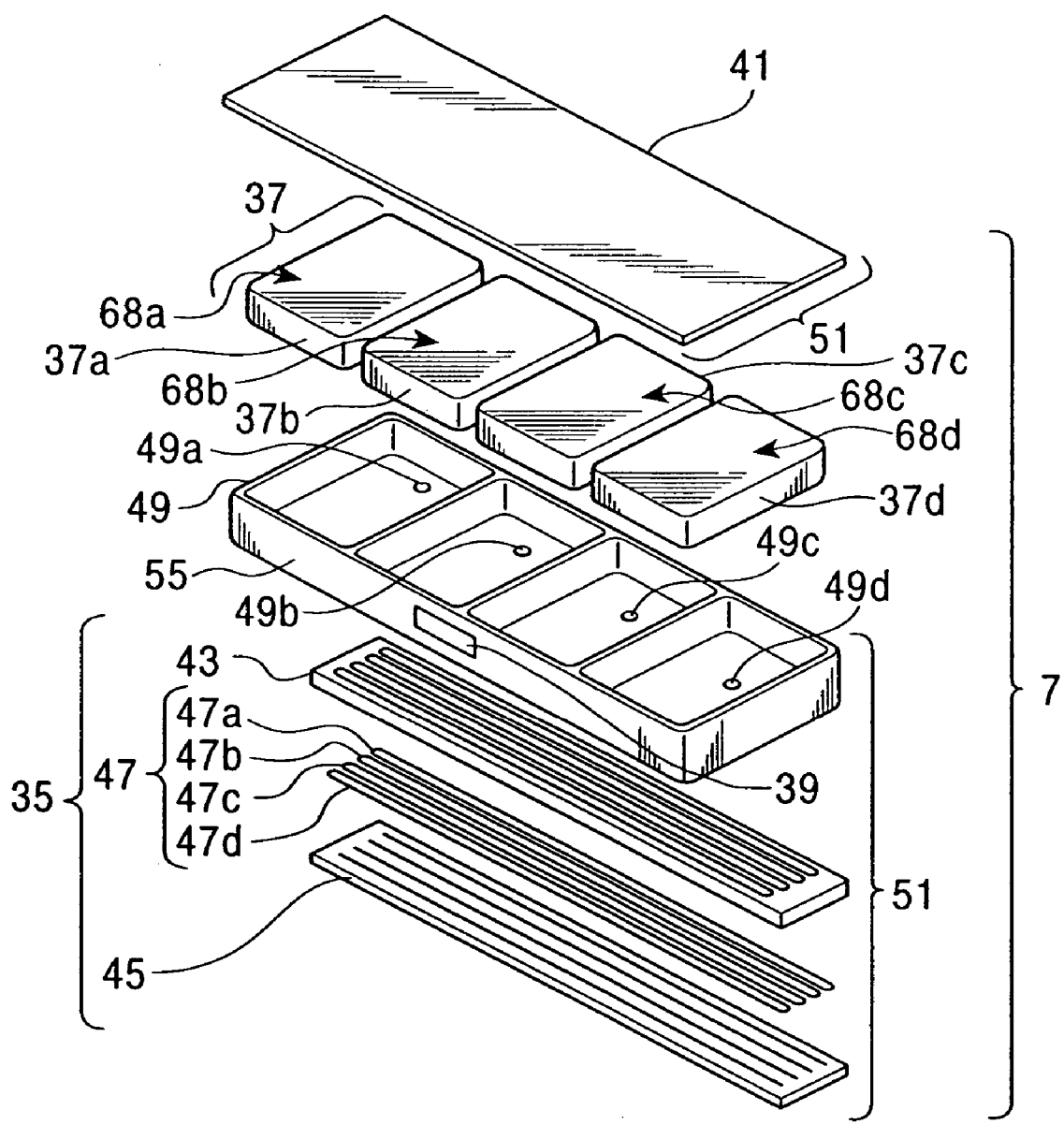
FIG. 5 is an exploded perspective view illustrating the configuration of the head assembly shown in FIG. 4.

FIG. 5 is an exploded perspective view illustrating the configuration of the head assembly 7 shown in FIG. 4.

The head assembly 7 includes a head cartridge 51 and an ink cartridge (storage means) 37.

The ink cartridge 37 has an ink tank for storing at least one color of ink. More specifically, the ink cartridge 37 has, for example, ink tanks containing four colors of ink, such as a yellow ink tank 37a, a magenta ink tank 37b, a cyan ink tank 37c, and a black ink tank 37d. Ink supplying/storing units (not shown) for supplying and storing the individual colors of ink are provided between the ink tanks 37a through 37d and an ink cartridge holder 49.

The head cartridge 51 includes a lid 41, the ink cartridge holder 49, and the discharge head 35. The discharge head 35 has a frame 43, head chips 47, and a plate 45. The head chips 47 consist of a first head chip 47a through a fourth head chip 47d.

The ink cartridge holder 49 has recessed portions according to the number of ink tanks 37a through 37d so that it can detachably hold them. Holes 49a through 49d are provided at the bottoms of the recessed portions to receive the ink supplying/storing units of the ink tanks 37a through 37d therein. When the ink tanks 37a through 37d are disposed in the recessed portions of the ink cartridge holder 49, the lid 41 is placed to cover the top surface of the ink tanks 37a through 37d. That is, the ink tanks 37a through 37d are hermetically sealed.

The first head chip 47a through the fourth head chip 47d discharge the corresponding four colors of ink therefrom. The first through fourth head chips 47a through 47d are strip-shaped portions, and are inserted between the plate 45 and the frame 43 in such a manner that the head chips 47a through 47d are arranged in parallel to each other in the longitudinal direction. The frame 43 is a planar portion, and is provided with narrow grooves which substantially match the configurations of the first through fourth head chips 47a through 47d. The frame 43 is fixed at the bottom surface of the ink cartridge holder 49. The plate 45 is a planar portion, and is provided with substantially linear nozzle holes along the configurations of the first through fourth head chips 47a through 47d.

The head assembly 7 is provided with individual information 39 (FIG. 4). The individual information 39 may be placed on any portion, such as on a side surface 55 of the ink cartridge holder 49. Alternatively, the individual information 39 may be attached to the head assembly 7 while being stored in a predetermined information recording medium. The individual information 39 has a head identification (ID), which serves as an identifier for distinguishing the head assembly 7 from other head assemblies.

Figure 6:
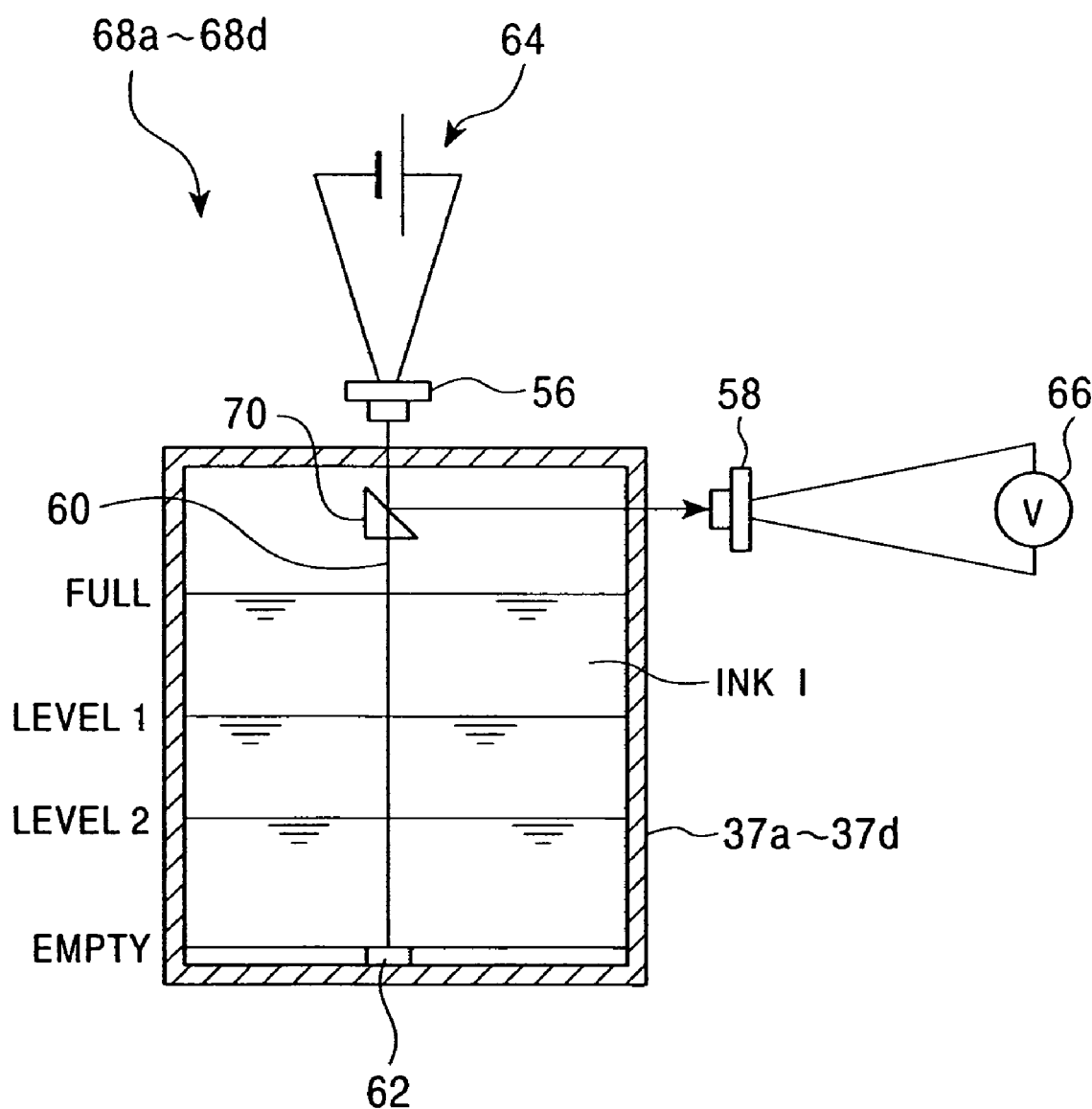
FIG. 6 is a sectional view illustrating the configuration of the remaining-ink detection devices.

FIG. 6 is a sectional view illustrating the configuration of the remaining-ink detection devices 68a through 68d shown in FIG. 5.

Since the configurations of the remaining-ink detection devices 68a through 68d are the same, only the configuration of the remaining-ink detection device 68a is discussed below. The remaining-ink detection device 68a has an applying portion 64, a photodiode 56, a prism 70, a reflector 62, a photodetector 58, and a measuring portion 66.

The applying portion 64 consists of a power supply source for applying a predetermined voltage to the photodiode 56, and a controller for the power supply source. With the application of the predetermined voltage, the photodiode 56 applies light 60 to the ink I via the prism 70. The prism 70 transmits the light 60 from the photodiode 56, and also guides the light 60 reflected by the reflector 62 to the photodetector 58. The photodetector 58 receives the light 60 passing through the ink I, and outputs a predetermined voltage according to the quantity of the light 60. The measuring portion 66 measures the output voltage of the photodetector 58. The portion of the ink cartridge 37a through which the light 60 passes is formed of a hole or a material for enabling the light 60 to pass therethrough.

The attenuation of the light 60 becomes larger with a greater amount of ink, and vice versa. Thus, the remaining-ink detection device 68a is able to detect the remaining amount of ink by measuring the output voltage of the photodetector 58 according to the quantity of the light 60.

Figure 7:
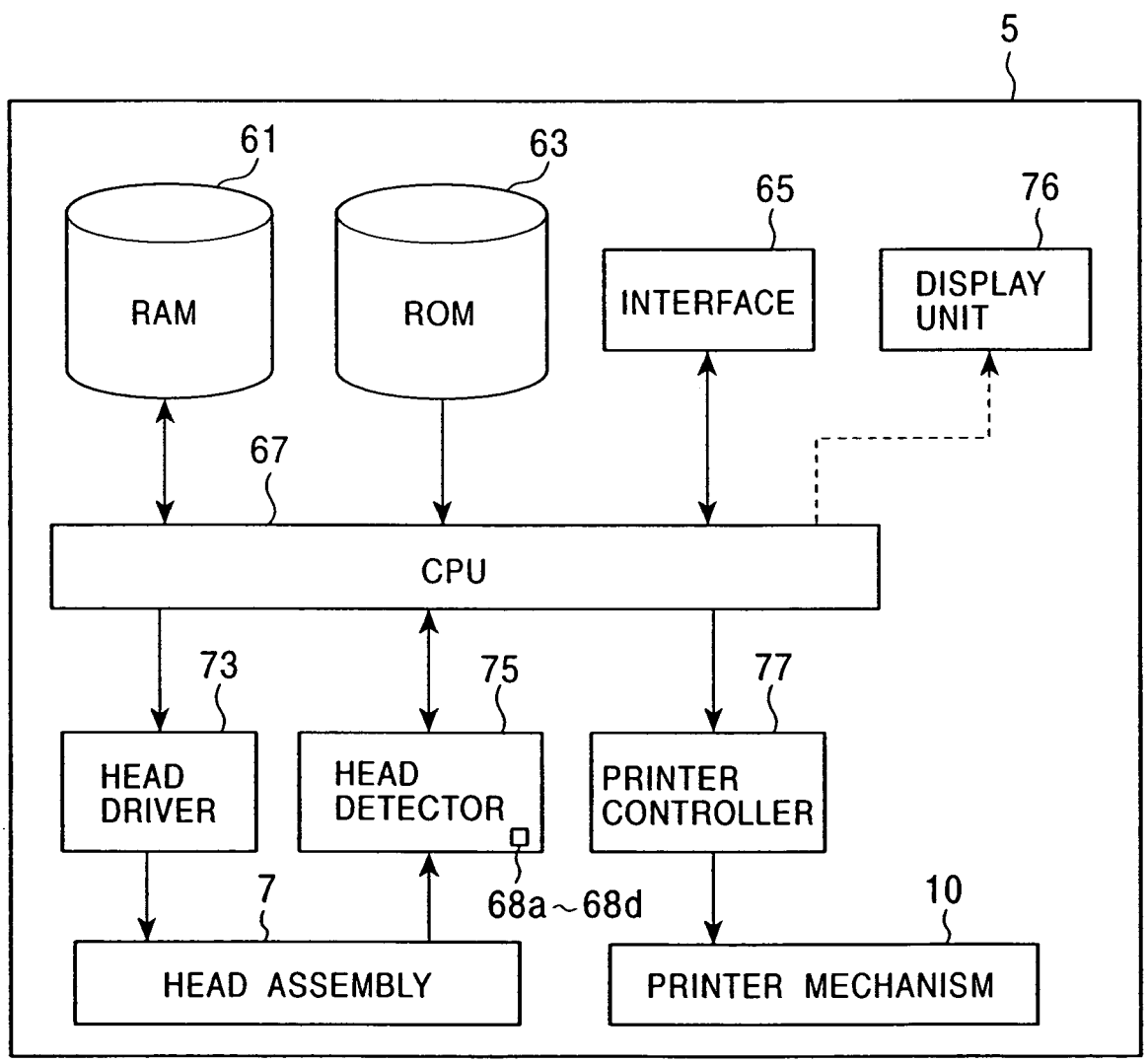
FIG. 7 is a block diagram illustrating the electrical configuration of the printer shown in FIG. 2.

FIG. 7 is a block diagram illustrating the electrical configuration of the printer 5 shown in FIG. 2.

The printer 5 is formed of a random access memory (RAM) 61, a read only memory (ROM) 63, a central processing unit (CPU) 67, a head driver 73, the head assembly 7, a head detector 75, a printer controller 77, the printer mechanism 10, and an interface 65. The printer 5 may preferably include the display unit 76.

The RAM 61 is a writable/readable information storage medium and is a work area for the CPU 67. The ROM 63 is a read-only information storage medium and provides stored information to the CPU 67. The ROM 63 may be a writable storage medium. The CPU 67 is connected to the RAM 61, the ROM 63, the head driver 73, the head detector 75, the printer controller 77, the display unit 76, and the interface 65 so as to control these elements and obtain data therefrom.

The head driver 73 controls the operation of the head assembly 7 under the control of the CPU 67. The head assembly 7 includes the ink cartridge 37 and the head cartridge 51 for discharging ink therefrom (FIG. 5). The head detector 75 obtains predetermined information from the head assembly 7, which is detachable/attachable from/to the printer 5, and detects, for example, that the head assembly 7 is attached to the printer 5. The head detector 75 also includes the remaining-ink detection devices 68a through 68d.

The printer controller 77 controls the operation of the printer mechanism 10 under the control of the CPU 67. The printer mechanism 10 is the overall mechanism for performing a printing operation in the printer 5.

The display unit 76 displays predetermined characters and images under the control of the CPU 67. The interface 65 is used for transmitting and receiving data, such as images to be printed, by connecting a printer cable to a Centronics interface or connecting a network LAN cable.

Figure 8:
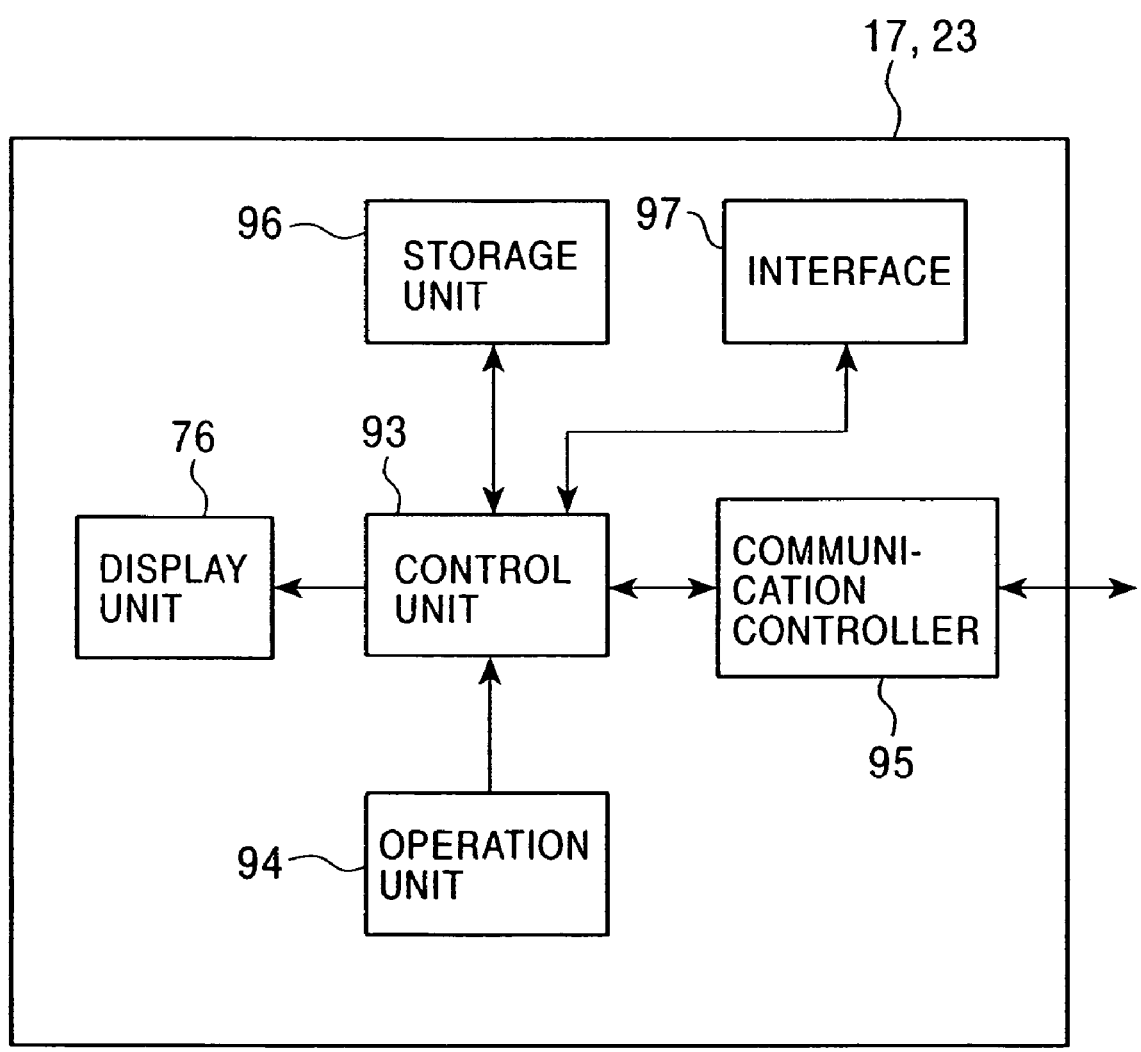
FIG. 8 is a block diagram illustrating the hardware electrical configuration of the service center server and the computer shown in FIG. 1.

FIG. 8 is a block diagram illustrating the hardware electrical configuration of the service center server 23 and the computer 17.

The service center server 23 is similar to the computer 17 in the electrical configuration except that the service center server 23 requires a higher processing capacity. Accordingly, a description is mainly given of the computer 17, and the features of the service center server 23 different from those of the computer 17 are discussed as required.

The computer 17 includes a control unit 93, a display unit 76, a storage unit 96, an interface 97, a communication controller 95, and an operation unit 94. It is not essential that the service center server 23 have the display unit 76, the interface 97, and the operation unit 94.

The control unit 93 is a computation unit, for example, a CPU, for controlling the overall computer 17. The storage unit 96 includes a writable/readable storage medium, such as a RAM, a read-only storage medium, such as a ROM, and a large-capacity storage medium, such as a hard disk. The control unit 93 operates software by using the RAM of the storage unit 96 as a work area. The display unit 76 displays predetermined characters or images under the control of the control unit 93. The interface 97 is a user interface, such as a Centronics interface or a universal serial bus (USB) interface. The communication controller 95 controls data communication performed in a network interface. The operation unit 94 is a user interface, such as a keyboard.

Figure 9:
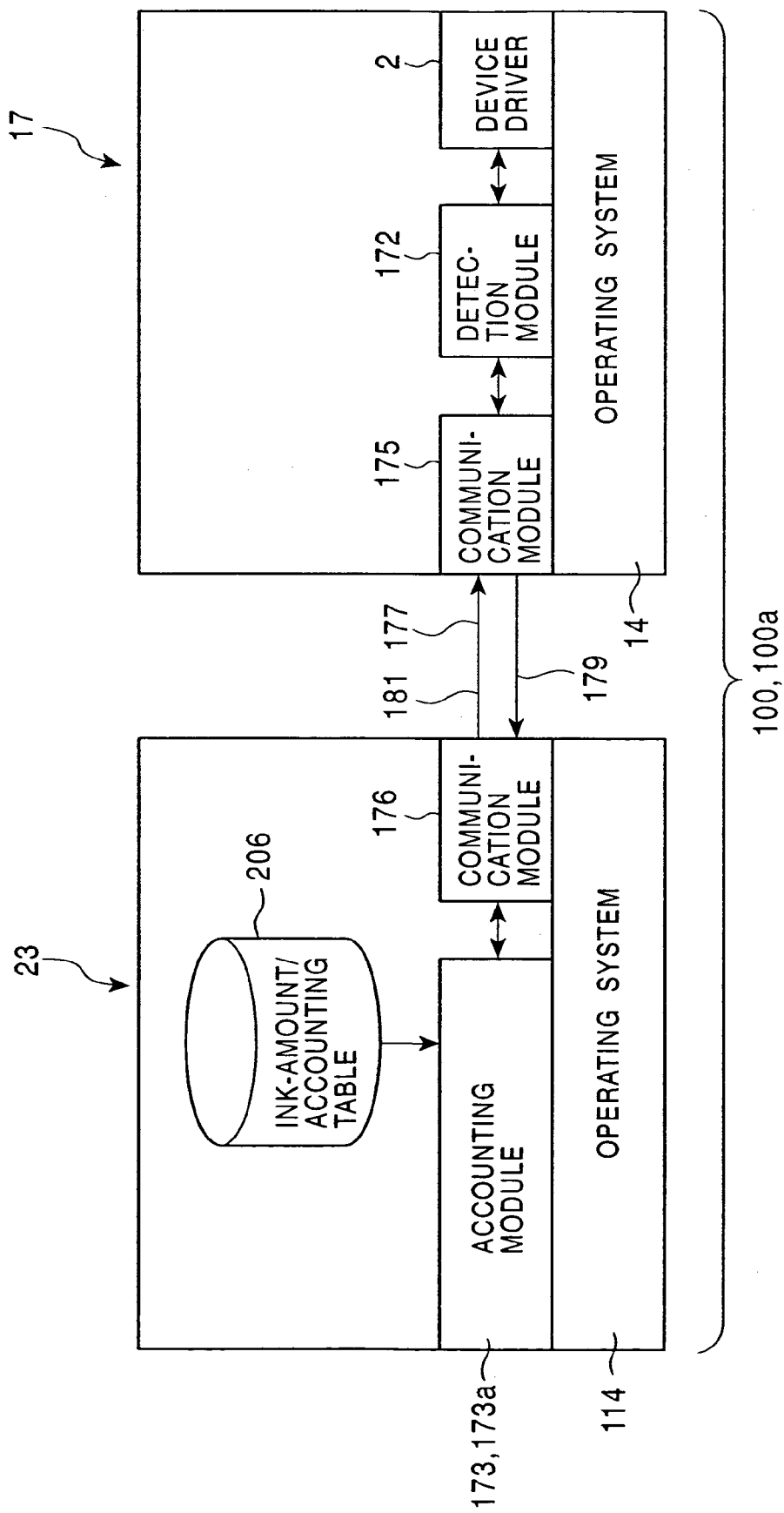
FIG. 9 is a block diagram illustrating the software configuration of the accounting system shown in FIG. 1.

FIG. 9 is a block diagram illustrating the software configuration of the accounting system 100 shown in FIG. 1.

Operating systems (OSs) 14 and 114 operate in the service center server 23 and the computer 17, respectively. The OSs 14 and 114 are basic software for controlling the operations of the software in the printer 5. Other software may serve the functions of the OSs 14 and 114, in which case, the OSs 14 and 114 may be omitted.

The service center server 23 includes the above-described OS 114, an ink-amount/accounting table 206, an accounting module 173 (program having an accounting function), and a communication module 176.

The ink-amount/accounting table 206 is managed by predetermined database software running on the OS 114. The ink-amount/accounting table 206 stores information for billing for the actual use of ink in the head assembly 7, which is attachable/detachable to/from the printer 5. The ink-amount/accounting table 206 includes, for example, a user ID, a head ID, the remaining amount of each color of ink, a unit price for each color of ink unit, and the billing amount with regular periods. That is, the ink-amount/accounting table 206 includes information concerning the use of ink for each user who attaches a head assembly 7 to the user's printer 5 or for each head ID of the head assembly 7. The user ID is an identifier, such as a code, for identifying the user of the head assembly 7. The head ID is an identifier for identifying a certain cartridge from the other cartridges.

The communication module 176 performs data communication with a communication module 175 of the computer 17 under the control of the accounting module 173.

The accounting module 173 stores the information of the remaining amount of ink in the printer 5 in the ink-amount/accounting table 206 according to the head ID. The accounting module 173 controls the communication module 176 to transmit a detection instruction 177 to the computer 17 connected to the printer 5. The detection instruction 177 indicates an instruction to obtain, for example, the information about the remaining amount of ink in the head assembly 7. The detection instruction 177 is not restricted to the amount of used ink or the remaining amount of ink in the printer 5, and may be any desired instruction.

The accounting module 173 also controls the communication module 176 to receive a detection result 179 from the printer 5. The accounting module 173 then stores the content of the received detection result 179 in the ink-amount/accounting table 206 according to the head ID. The accounting module 173 also calculates the billing amount with regular periods or predetermined periods according to the use of each color of ink in the head assembly 7.

The accounting module 173 requests the user to pay for the calculated cost. That is, the accounting module 173 withdraws the calculated billing amount from, for example, a bank account specified by the user, or settles it by a credit card.

The computer 17 includes the OS 14, the communication module 175, a detection module 172, and a device driver 2. The device driver 2 is software for controlling the head driver 73 and the printer controller 77 shown in FIG. 7, and for managing the individual elements connected to the CPU 67.

The detection module 172 shown in FIG. 9 controls the device driver 2, and instructs the remaining-ink detection devices 68a through 68d shown in FIG. 7 to detect the remaining amount of ink of the head assembly 7, and also obtains the detection result 179 indicating the information about the remaining amount of ink. The items on the statuses of the printer 5 detected by the detection module 172 are prestored, for example, in the ROM 63 shown in FIG. 7. If the ROM 63 is rewritable, these items may be changed. The communication module 175 transmits the detection result 179 to the service center server 23.

A description is now given of the accounting method employed by the above-configured accounting system 100.

Overall, the accounting system 100 bills for the actual use of ink in the printer 5 in which a printing operation is performed by driving the head assembly 7. More specifically, the accounting system 100 bills for the actual use of ink after the ink is used. That is, a post-payment method is employed in the accounting system 100.

Figure 10:
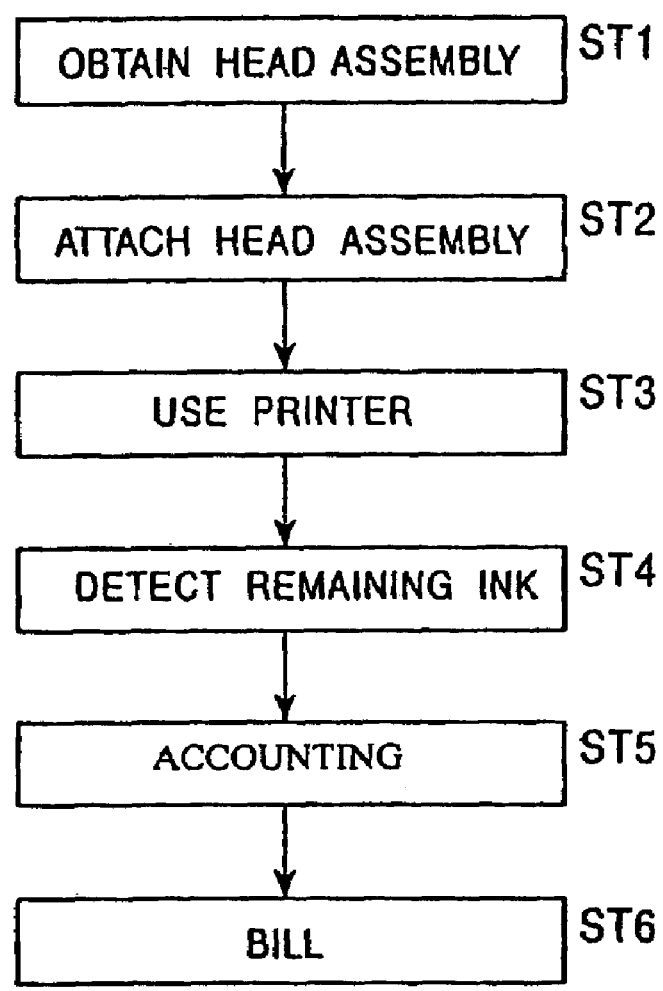
FIG. 10 is a flow chart illustrating an accounting method employed by the accounting system.

FIG. 10 is a flow chart illustrating an example of the accounting method employed by the accounting system 100.

The user owns the printer 5 shown in FIG. 2, and the head assembly 7 is to be detachably attached to the printer 5. In step ST1, the user obtains the head assembly 7 in which a predetermined amount of each color of ink is stored. Then, in step ST2, the user attaches the head assembly 7 to the printer 5. In step ST3, the user performs a printing operation by using the printer 5, and consumes the ink of the head assembly 7. A plurality of colors of ink are stored in the head assembly 7, and the amount of use of ink is different among the individual colors of ink.

In step ST4, the printer 5 detects the amount of use (or remaining amount) of each color of ink as discussed above. Meanwhile, the service center server 23 obtains the information about the amount of use of ink with regular periods, and the accounting module 173 shown in FIG. 9 stores the information about the amount of use of each color of ink in the ink-amount/accounting table 206. Then, in step ST5, the accounting module 173 shown in FIG. 9 obtains the information concerning the amount of the use of each color of ink according to the user ID, and the unit price for each color of ink from the ink-amount/accounting table 206. The accounting module 173 then determines the billing amount by multiplying the amount of the use of ink with the unit price for each color of ink according to the user ID. In step ST6, the accounting module 173 requests the user to pay for the billing amount determined in step ST5, as discussed above.

Figure 11:
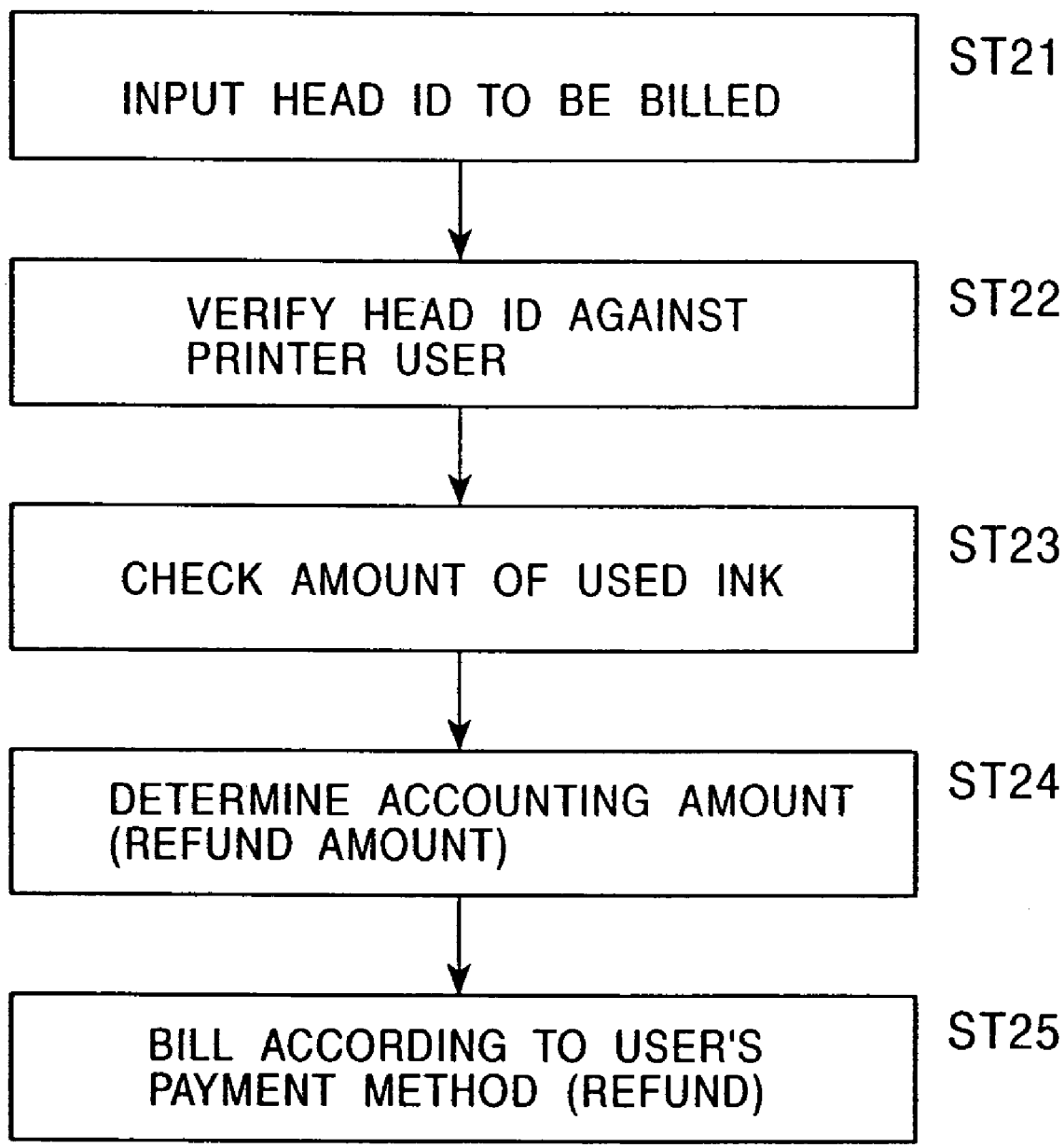
FIG. 11 is a flow chart illustrating details of step ST6 shown in FIG. 10.

Details of step ST6 are given below with reference to FIG. 11. In step ST21, in the service center, the head ID (head assembly ID) to be billed is input at a predetermined time. Then, in step ST22, the accounting module 173 verifies the head ID against the user ID (printer user). In step ST23, the accounting module 173 checks the amount of ink based on the above-described information. In step ST24, the accounting module 173 determines the billing amount by the accounting method (discussed below) selected by the user and the amount of the use of ink. Subsequently, in step ST25, the accounting module 173 requests the user to pay for the billing amount calculated in step ST24 according to the user's payment method. The accounting module 173 may automatically deduct the billing amount from, for example, a bank account specified by the user.

Figure 14:
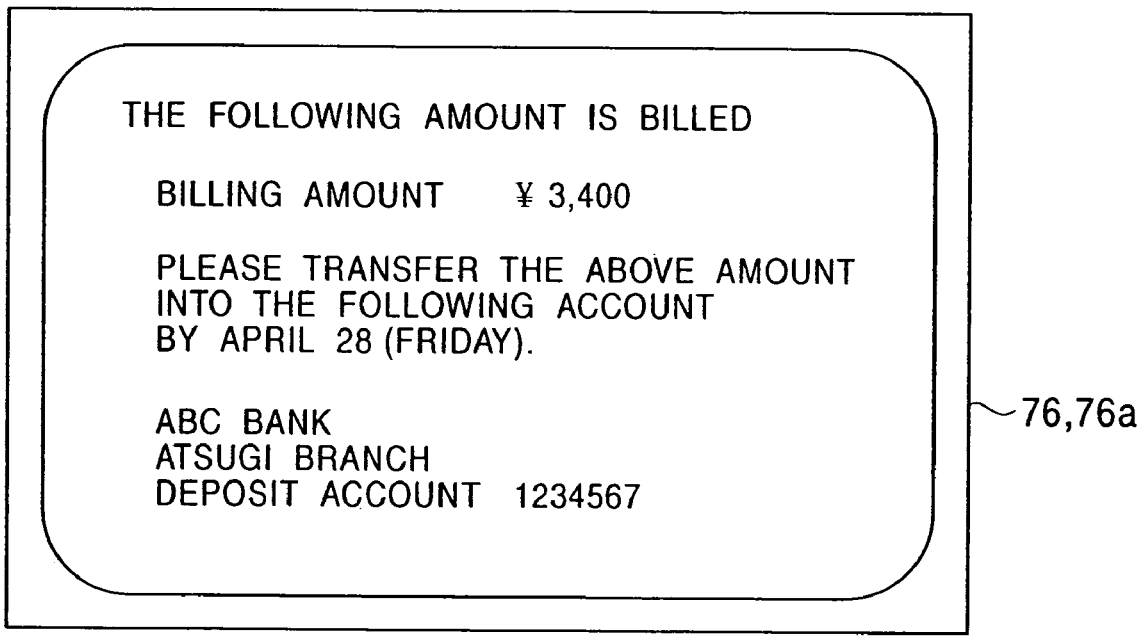

Before the accounting module 173 requests the user to pay for the cost, the display unit 76 of the printer 5 shown in FIG. 2 or the display unit 76a of the computer 17 connected to the printer 5 may indicate messages shown in FIGS. 12 through 14. That is, the accounting module 173 shown in FIG. 9 has the function of transmitting an accounting result 181 including the use of each color of ink at a certain time and the billing amount to the computer 17. The computer 17 then displays the above information, as shown in FIG. 12, on the display unit 76a or the display unit 76 of the printer 5. This enables the user to visually check the billing amount.

Then, confirmation screens shown in FIGS. 13 and 14 are shown on the display unit 76a of the computer 17. The user who has already registered in the service center server 23 is able to select, as shown in FIG. 13, whether the user transfers money from a registered bank account into the account of the service center.

On the other hand, for the user who has not yet registered in the service center server 23 or who has selected not to transfer money from the user's bank account, information indicating the account of the service center shown in FIG. 14 is indicated. In this case, the user has to transfer the above-described billing amount into, for example, a deposit account No. 1234567 of the Atsugi branch of the ABC bank.

Figure 15:
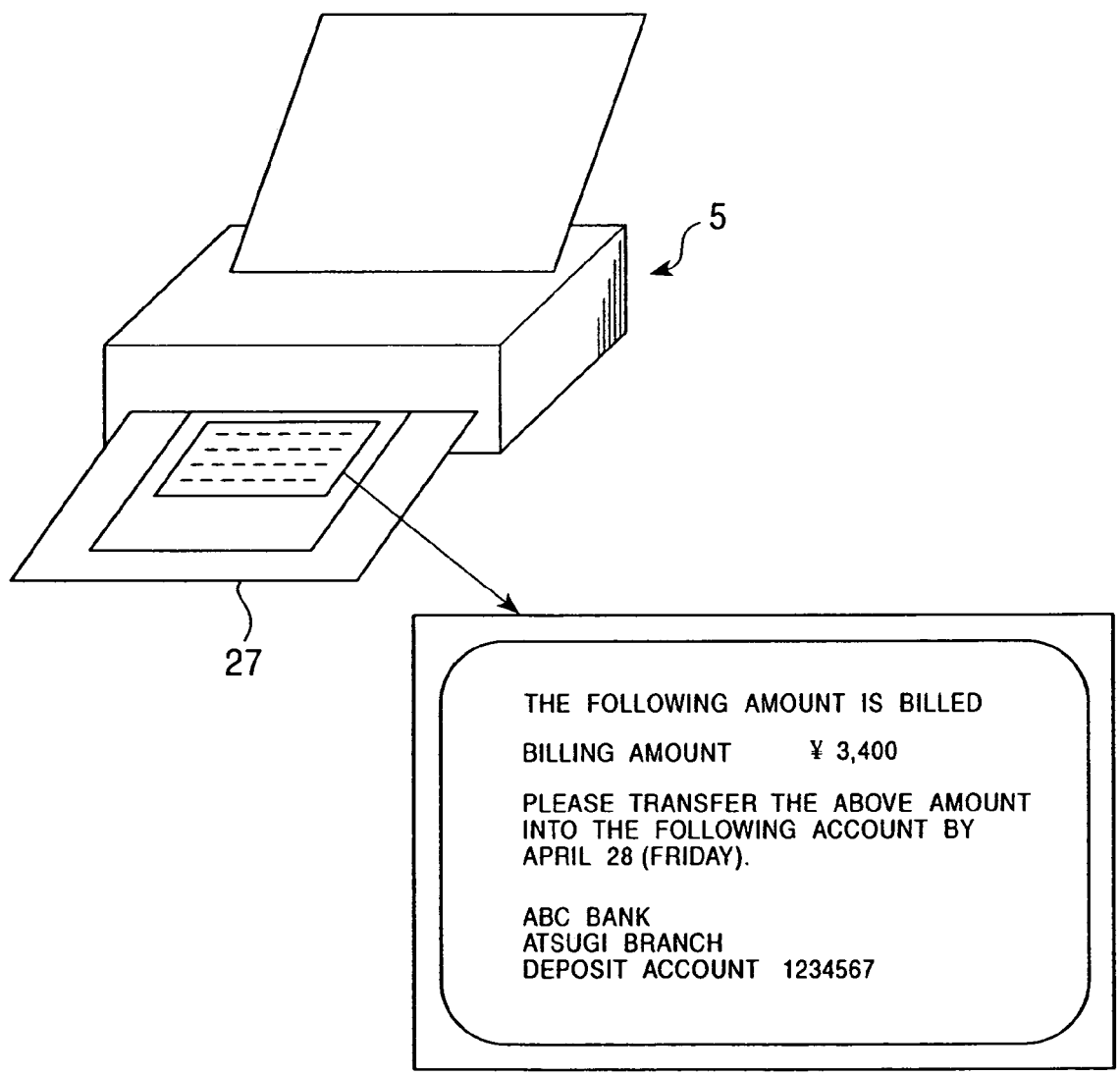
FIG. 15 illustrates that the billing amount for the use of ink is printed on a recording sheet.

The billing amount may be printed on the recording sheet 27, as shown in FIG. 15, rather than being displayed on the display unit 76 of the printer 5. This enables the user not only to visually check the billing amount, but also to keep it in writing.

According to the first embodiment, in the post-payment accounting system 100, the remaining amount of each color of ink is detected, and thus, it is possible to bill the user according to the actual use of ink in the head assembly 7 of the printer 5. Additionally, even if the discharge head 35 of the head assembly 7 does not function properly, the service center determines the billing amount according to the actual use of ink, thereby avoiding the waste of the unused ink.

Second Embodiment

An accounting system (accounting apparatus) 10a constructed in accordance with a second embodiment of the present invention is discussed below. The configuration and the features of the accounting system 100a are substantially similar to those of the accounting system 100 of the first embodiment. Accordingly, the same elements as those of the accounting system 100 are designated with like reference numerals in FIGS. 1 through 9, 11, and 15, and the features different from those of the first embodiment are mainly described below.

The accounting method of the accounting system 100a is different from that of the accounting system 100 of the first embodiment. Details of the accounting method of the second embodiment are as follows.

In the accounting system 100a, the user is billed according to the actual use of ink in the printer 5 in which a printing operation is performed by driving the head assembly 7. More specifically, the accounting system 10a sets a predetermined billing amount in advance according to the largest possible amount of ink which can be filled in the ink cartridge 37 of the head assembly 7. Then, the amount of use of ink in the printer 5 is detected, and money is refunded to the user according to the remaining amount of ink. Thus, the accounting system 100a employs a prepayment method.

Figure 16:
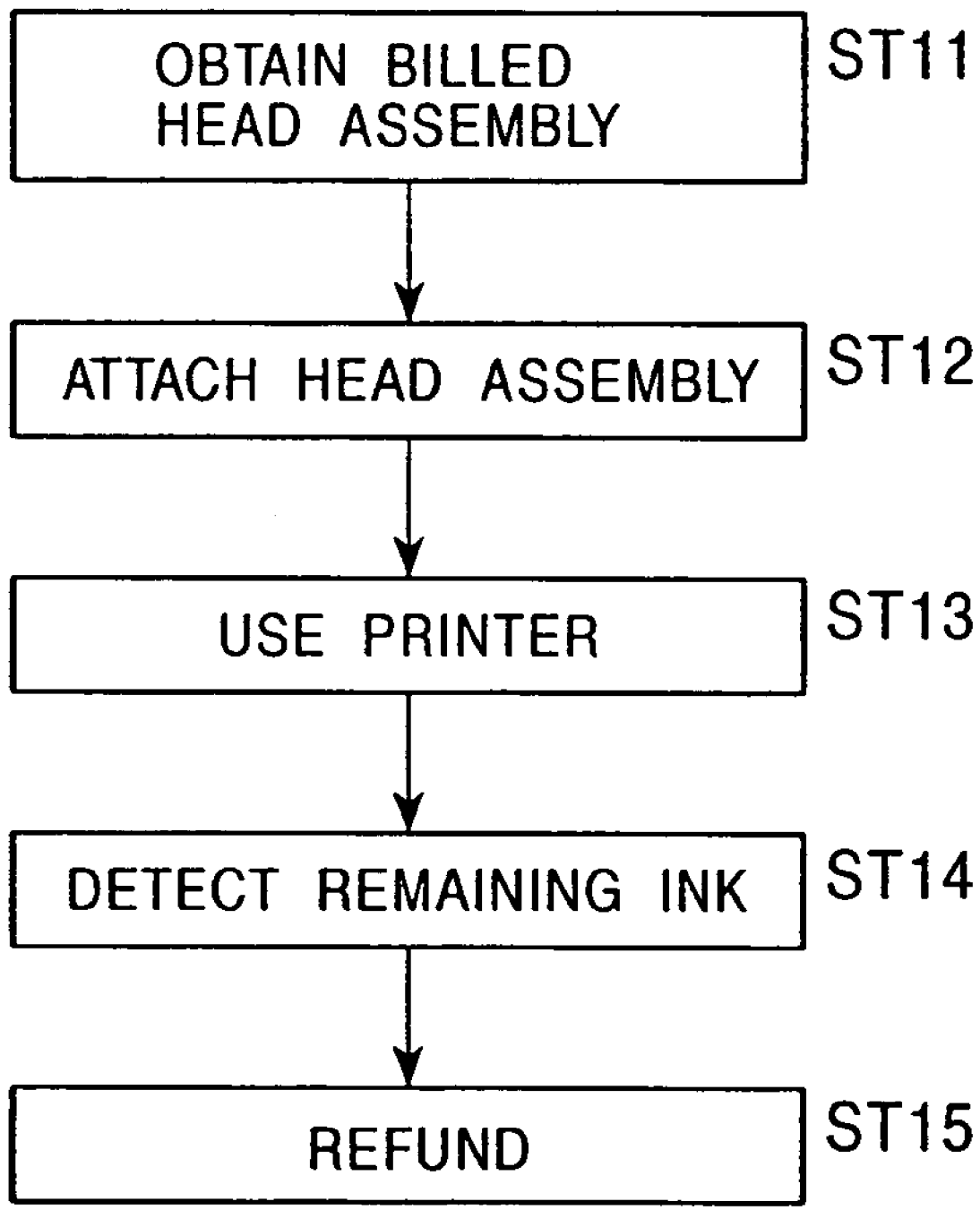
FIG. 16 is a flow chart illustrating an accounting method employed by an accounting system according to a second embodiment of the present invention.

FIG. 16 is a flow chart illustrating the accounting method employed by the accounting system 100a of the second embodiment.

The user owns the printer 5 shown in FIG. 2. The head assembly 7 is to be detachably attached to the printer 5. In step ST11, the user obtains the head assembly 7. In this head assembly 7, a predetermined billing amount is set in advance according to the largest possible amount of each color of ink which can be filled in the ink cartridge 37. That is, when the user consumes the whole amount of ink stored in the ink cartridge 37, the entire amount of money is billed to the user. In step ST12, the user attaches the head assembly 7 to the printer 5. Then, in step ST13, the user performs a printing operation by using the printer 5, and uses the ink of the head assembly 7. A plurality of colors of ink are stored in the head assembly 7, and the amount of use of ink is different among the individual colors of ink.

In step ST14, the printer 5 detects the amount of the use of ink (or the remaining amount of ink), as discussed above. Meanwhile, the service center server 23 obtains the information concerning the amount of the use of ink with regular periods, and the accounting module 173 shown in FIG. 9 stores the information of the amount of use of each color of ink in the ink-amount/accounting table 206. Subsequently, in step ST15, the accounting module 173 obtains the information of the amount of use of each color of ink according to the user ID and the unit price for each color of ink from the ink-amount/accounting table 206 so as to refund money to the user according to the amount of unused ink. The accounting module 173 then determines the amount of refund by multiplying the amount of unused ink with the unit price for each color of ink according to the user ID. Thus, the accounting module 173 refunds the calculated amount of money to the user.

Details of step ST15 shown in FIG. 16 are given below with reference to FIG. 11. In step ST21, the head ID (head assembly ID) to be billed is input. Then, in step ST22, the accounting module 173 verifies the head ID against the user ID. In step ST23, the accounting module 173 checks the amount of use of ink based on the above-described information. Then, in step ST24, the accounting module 173 determines the amount of refund according to the accounting method selected by the user (discussed below) and the amount of use of ink. Subsequently, in step ST25, the accounting module 173 refunds the calculated amount of money to the user according to the receiving method specified by the user. The accounting module 173 may automatically transfer the refund into, for example, a bank account specified by the user.

Before the accounting module 173 refunds money to the user, the display unit 76 of the printer 5 shown in FIG. 2 or the display unit 76a of the computer 17 connected to the printer 5 may indicate messages shown in FIGS. 17 through 19. That is, the accounting module 173 shown in FIG. 9 has the function of transmitting the accounting result 181 including the information about the amount of use (or remaining amount) of each color of ink at a certain time and the refunded amount to the computer 17. The computer 17 then displays the above information, as shown in FIG. 17, on the display unit 76a of the computer 17 or the display unit 76 of the printer 5. This enables the user to visually check the refunded amount.

Confirmation screens shown in FIGS. 18 and 19 are displayed on the display unit 76a of the computer 17. The user who has already registered in the service center server 23 is able to select, as shown in FIG. 18, whether the refund is to be transferred from the service center to the user's registered bank account.

On the other hand, for the user who has not registered in the service center server 23 or the user who has selected not to transfer the refund to the user's registered account, the user is asked to input the information about the user's account, as shown in FIG. 19. The user is then able to input the bank name, the branch name, and the account name (account No.).

According to the second embodiment, advantages substantially similar to those obtained by the first embodiment can be exhibited. Additionally, the second embodiment saves the user from paying for the cost to the service center according to the amount of use of ink.

Third Embodiment

A third embodiment of the present invention is described below. In the third embodiment, different accounting methods are employed.

The configuration of the third embodiment is similar to those of the first and second embodiments, except a list of the accounting methods for the use of ink shown in FIG. 20, and an explanation thereof will thus be omitted.

The screen shown in FIG. 20 is displayed on the display unit 76 of the printer 5 or the display unit 76a of the computer 17. On this screen, a description of accounting methods for the amount of use of ink is given, and the user is able to select one of the accounting methods, for example, from three methods, method A, method B, and method C. Examples of these methods are discussed below.

FIG. 21 illustrates the screen on which the types of maintenance and the billing systems are shown. As shown in FIG. 21, "description of the types of maintenance and billing systems", and more specifically, items, such as "flat rate for every head replacement (head cartridge 51 or head assembly 7)", "flat rate up to the use of a certain amount of ink", "rank rate according to the 10 amount of use of ink", "basic fee plus variable rate according to the amount of use of ink", "variable rate according to the amount of use of ink", "flat rate plus refund for unused ink", and "basic fee plus (flat rate plus refund)," are indicated.

The item "flat rate for every head replacement" indicates that a flat rate is billed every time the head assembly 7 is replaced. The item "flat rate up to the use of a certain amount of ink" indicates that a flat rate is billed up to the use of a certain amount of ink. The item "rank rate according to the amount of use of ink" indicates that different ranks are set according to the amount of use of ink, and the user is billed for the rate according to the rank. The item "basic fee plus variable rate according to the amount of use of ink" indicates that the user is billed for the rate according to the amount of use of ink and the basic fee. The item "variable rate according to the amount of use of ink" indicates that the user is billed for the rate according to the amount of use of ink. These items are mainly used in the first embodiment.

The item "flat rate plus refund for unused ink" indicates that a flat rate for the ink stored in the head cartridge 51 or the head assembly 7 is prepaid, and money is refunded to the user of the printer 5 according to the amount of unused ink. The item "basic fee plus (flat rate plus refund for unused ink)" indicates that the basic fee is billed, and a flat rate for the ink stored in the head cartridge 51 or the head assembly 7 is prepaid, and money is refunded to the user of the printer 5 according to the amount of unused ink. These items are used in the second embodiment.

The present invention is not restricted to the foregoing embodiments.

Although in the aforementioned embodiments the remaining amount of ink is optically measured, it may be measured by another method.

Additionally, in the above-described embodiments, the billing for the use of ink or the refund for unused ink is performed according to a bank transfer. However, it may be performed by a bank settlement or a credit card settlement.

In the foregoing embodiments, the service center server 23 of the service center and the printer 5 (computer 17) are connected to each other via the network 90. Then, the amount of use of ink in the printer 5 is detected by the printer 5, and the service center server 23 calculates the billing amount or refund according to the amount of use of ink. However, the present invention is not limited to the above-described arrangement. The amount of use of ink may be detected in the service center, in which case, the head assembly 7 is transferred to the service center by a predetermined transfer means. With this arrangement, it is not necessary to provide the remaining-ink detection devices 68a through 68d for the printer 5, thereby simplifying the structure of the printer 5.

A program having an accounting function for executing the above-described series of processing may be installed in a computer, and the computer may execute the program. Program storage media for storing such a program include not only package media, such as a floppy disk, a compact disc read only memory (CD-ROM), and a digital versatile disk (DVD), but also a semiconductor memory and a magnetic disk for temporarily or permanently storing the program. The program may be transferred and stored in such storage media by cable, such as a LAN, the Internet, or a digital satellite broadcast, or wireless communication media. The program may also be transferred and stored via various communication interfaces, such as routers or modems. An electronic device into which the program having an accounting function is installed may be provided with a drive unit for reading at least the information of the above-described program storage medium.

The individual features of the above-described embodiments may partly be omitted, or may be combined in a manner different from the disclosed embodiments.

What is claimed is:

1. An accounting method comprising:
providing an ink cartridge attachable to a user's printer for performing a printing operation by driving the ink cartridge to discharge ink stored in the ink cartridge;
receiving a billing system selected by the user from a plurality of billing systems; and
billing the user a billing amount according to an amount of ink used for performing the printing operation and the selected billing system,
wherein billing the user comprises setting a prepayment amount to be paid in advance according to a largest possible amount of ink filled in the ink cartridge, and a refund is given from the amount prepaid according to a remaining amount of ink detected in the ink cartridge.

2. An accounting method according to claim 1, wherein the billing amount is determined after the amount of ink used for performing the printing operation is detected.

3. An accounting method according to claim 2, wherein the billing amount for the ink used for performing the printing operation is indicated.

4. A computer-readable medium storing a computer program that when executed on a processor cause the processor to execute an accounting method, the method comprising the steps of:
providing an ink cartridge attachable to a user's printer for performing a printing operation by driving the ink cartridge to discharge ink stored in the ink cartridge;
receiving a billing system selected by the user from a plurality of billing systems; and
billing the user a billing amount according to an amount of ink used for performing the printing operation and the selected billing system,
wherein billing the user comprises setting a prepayment amount to be paid in advance according to a largest possible amount of ink filled in the ink cartridge, and a refund is given from the amount prepaid according to a remaining amount of ink detected in the ink cartridge.

5. The computer-readable medium according to claim 4, wherein the billing amount is determined after the amount of ink used for performing the printing operation is detected.

6. The computer-readable medium according to claim 5, wherein the billing amount for the ink used for performing the printing operation is indicated.

* * * * *